US012609807B2

(12) United States Patent
Reimann et al.

(10) Patent No.: US 12,609,807 B2
(45) Date of Patent: Apr. 21, 2026

(54) RECEIVER SYNCHRONIZATION FOR LIGHT COMMUNICATIONS

(71) Applicant: The Regents of the University of Michigan, Ann Arbor, MI (US)

(72) Inventors: Jethro Reimann, Dearborn, MI (US); Michael Putty, Grosse Pointe Woods, MI (US); Sridhar Lakshmanan, Belleville, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 105 days.

(21) Appl. No.: 18/125,412

(22) Filed: Mar. 23, 2023

(65) Prior Publication Data

US 2023/0308254 A1 Sep. 28, 2023

Related U.S. Application Data

(60) Provisional application No. 63/322,908, filed on Mar. 23, 2022.

(51) Int. Cl.
H04B 10/00 (2013.01)
H04L 7/00 (2006.01)
*H04J 14/00* (2006.01)

(52) U.S. Cl.
CPC .................................... H04L 7/002 (2013.01)

(58) Field of Classification Search
CPC ........ H04B 10/60; H04B 10/66; H04B 10/69; H04B 10/695
See application file for complete search history.

(56) References Cited

U.S. PATENT DOCUMENTS

| | | |
|---|---|---|
| 5,838,749 A | 11/1998 | Casper et al. |
| 2010/0067634 A1 | 3/2010 | Furman et al. |
| 2013/0034197 A1 | 2/2013 | Aweya et al. |
| 2013/0235889 A1 | 9/2013 | Aweya et al. |
| 2014/0161470 A1 | 6/2014 | Zelensky et al. |
| 2017/0373823 A1 | 12/2017 | Zhou et al. |
| 2017/0373826 A1 | 12/2017 | Travis |
| 2019/0190617 A1* | 6/2019 | Aouini ............... H04B 10/6165 |

(Continued)

OTHER PUBLICATIONS

Japanese Office Action corresponding to application 2024-556563, dated Sep. 17, 2025, 8 pages.

(Continued)

*Primary Examiner* — Daniel G Dobson
(74) *Attorney, Agent, or Firm* — Reising Ethington P.C.

(57) ABSTRACT

A light communication system, receiver, and method for synchronizing a receiver with a transmitter so as to decode a data input stream transmitted by the transmitter and received at the receiver. The method includes: receiving a data input stream at a receiver, the data input stream having a first data rate that is set based on a transmitter clock rate; generating a wave; obtaining a phase error between the data input stream and the generated wave; determining a synchronized clock rate by using the phase error to adjust the frequency of the generated wave so as to match the frequency of the generated wave to the transmitter clock rate of the data input stream; and using the synchronized clock rate to decode the data input stream so as to obtain data encoded in the data input stream.

17 Claims, 11 Drawing Sheets

(56) References Cited

U.S. PATENT DOCUMENTS

2020/0195354 A1    6/2020   Perin et al.
2021/0109563 A1    4/2021   Shahab

OTHER PUBLICATIONS

International Search Report corresponding to application PCT/US2023/016094, dated Jul. 3, 2023, 4 pages.
Written Opinion corresponding to application PCT/US2023/016094, dated Jul. 3, 2023, 6 pages.
Translation of Japanese Office Action corresponding to application 2024-556563, dated Jan. 13, 2026, 1 page.
Extended European Search Report corresponding to application EP23775670, dated Feb. 27, 2026, 15 pages.

\* cited by examiner

Transmitting Device 12

Transmitter 16

Power Supply 20

Electronic Controller 22

LED(s) 24

Receiving Device 14

Receiver 18

Photodetector 19

Clock Extraction Module 30

Finite-State Machine (FSM) 32

System Clock 34

Processor 36

Memory 37

Begin

Receive Data Input Stream At Receiver — _210_

Generate Wave — _220_

Obtain Phase Error Between Data Input Stream and Generated Wave — _230_

Determine a Synchronized Clock Rate By Using the Phase Error to Adjust Generated Wave Until Frequency of Generated Wave Matches Clock Rate of Data Input Stream — _240_

Decode Data Input Stream Using Synchronized Clock Rate to Obtain Data — _250_

End

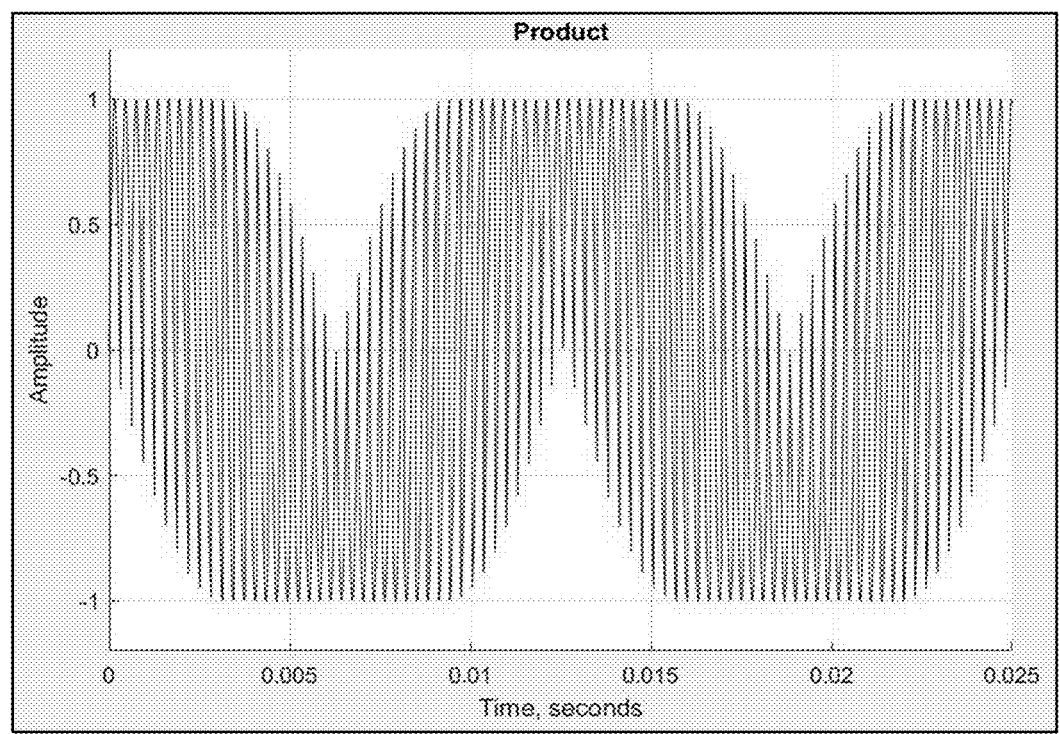
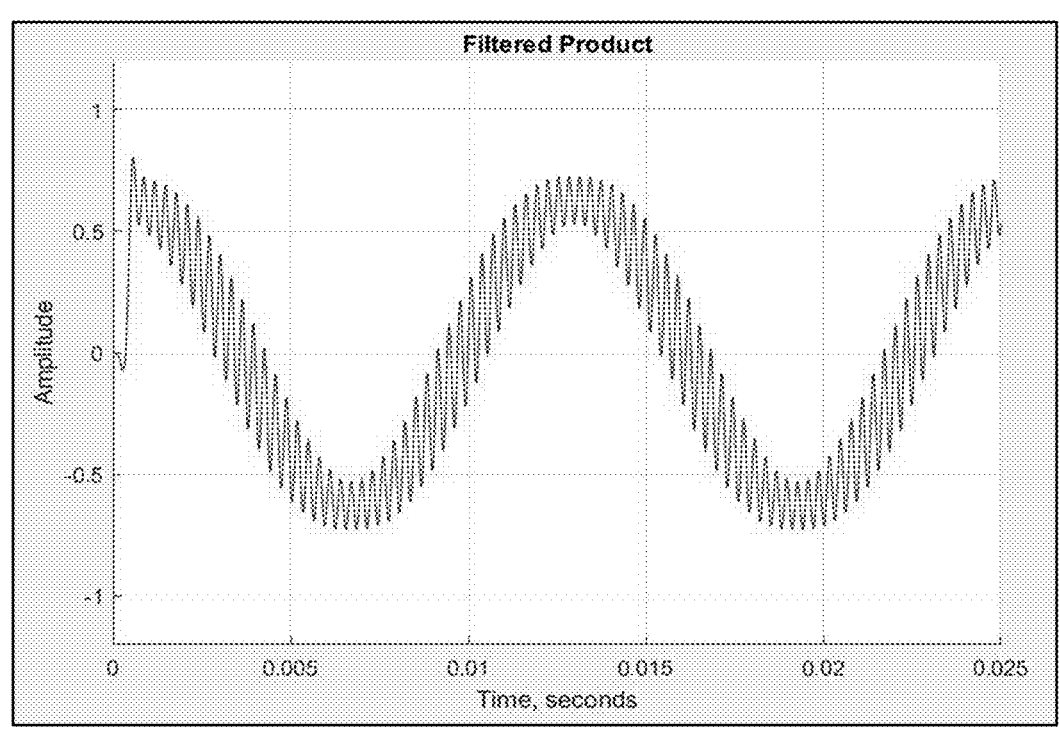

RECEIVER SYNCHRONIZATION FOR LIGHT COMMUNICATIONS

TECHNICAL FIELD

This disclosure relates to methods and systems for synchronizing a receiver for purposes of decoding communications transmitted using a light communication system, such as synchronizing a clock of the receiver to a received data input stream.

BACKGROUND

Optical or light communication systems, in which light is modulated to encode data or information for communication between light communication nodes, are useful for various applications, such as for establishing ad hoc networks among peers; for example, in one vehicular application, such light communication systems may be used for vehicle communications as described in U.S. Pat. No. 11,245,469. However, such systems may involve or rely on extrinsic synchronization to synchronize the receiver with the transmitter so that the data encoded may properly be decoded. Such extrinsic synchronization refers to a synchronization process where the receiver is synchronized with the transmitter through use of a communications besides (and different from) the light communication system having the receiver to be synchronized. For example, extrinsic synchronization may involve informing the receiver of a data or clock rate of the input stream to be transmitted through use of a cellular network or dedicated short range communications (DSRCs). It has been discovered that there is needed a system and method for enabling intrinsic synchronization for ad hoc light communication networks—i.e., synchronization for ad hoc light communication networks that does not rely on either external communications, such as those using DSRCs or cellular communications, or on providing configuration to the vehicle during manufacture, such as by setting all clock rates of light communication nodes to be the same.

U.S. Pat. No. 11,245,469 teaches a vehicle line-of-sight optical communication system for use in ad hoc networks formed with a vehicle during traveling of the vehicle along a roadway. As discussed therein, vehicle-to-vehicle (V2V) and vehicle to infrastructure (V2I) networks provide the capability to significantly reduce vehicular collisions by allowing vehicles to exchange messages with other vehicles, such as "changing lanes," "braking hard," "ice patch," etc. Active and passive sensor-based vehicle object detection systems that do not involve V2V and V2I communication rely on the interpretation of signals to determine the behavior of nearby vehicles and other objects. The signals could be corrupted or jammed leading to wrong interpretation. Sensors can also fail leading to lost capability. A V2V network, on the other hand, relies on explicit information exchanged between vehicles in the form of data packets. These packets, if received without error, provide precise unambiguous information about the current status (e.g., position, speed, and heading) and intention (e.g., changing lanes, braking hard, making right turn) from nearby vehicles. This information may be fused with information from existing sensors (e.g., cameras, radars, lidars) to improve driving.

In realistic traffic scenarios (e.g., major roadways with heavy traffic) the number of vehicles, the speeds at which they are moving, and the continually changing position and heading relative to each other makes achieving a low latency, reliable V2V and/or V2I network very challenging.

V2V networks that rely on radio frequency (RF) communications, such as those using DSRCs, are widely envisioned to address this issue. However, these RF networks have inherent disadvantages due to the propagation characteristic of RF signals. The RF signals tend to propagate in patterns that are omnidirectional and in a plane. The result is that many more vehicles than those desired would receive an RF signal transmitted from a host vehicle. Thus, a network architecture based on DSRC may require additional processing and hardware overhead to determine which vehicles form a subnet, manage the orthogonal channel assignments (e.g., time, frequency, coding, and space) to those subnets, and then route packets between the vehicles in the subnet. Moreover, due to the continually changing position and orientation of vehicles relative to each other, these network must be capable of performing these tasks very quickly.

In some implementations, synchronization of a transmitter, such as one or more light sources, and a receiver may be carried out using external communications, such as Wi-Fi™ Bluetooth™, or other DSRC. Nonetheless, as mentioned above, it has been discovered that there is a need for a system and method for enabling intrinsic synchronization for ad hoc light communication networks—i.e., synchronization for ad hoc light communication networks that does not rely on external communications, such as any of those DSRCs described above, or through constraining the system to predefined properties or parameters.

SUMMARY

In accordance with an aspect of the disclosure, there is provided a method for synchronizing a receiver with a transmitter so as to decode a data input stream transmitted by the transmitter and received at the receiver. The method includes: receiving a data input stream at a receiver, the data input stream having a first data rate that is set based on a transmitter clock rate; generating a wave; obtaining a phase error between the data input stream and the generated wave; determining a synchronized clock rate by using the phase error to adjust the frequency of the generated wave so as to match the frequency of the generated wave to the transmitter clock rate of the data input stream; and using the synchronized clock rate to decode the data input stream so as to obtain data encoded in the data input stream.

According to various embodiments, this method may further include any one of the following features or any technically-feasible combination of some or all of these features:

the method further comprises: inputting the phase error into a proportional integral (PI) controller, and wherein the PI controller is connected to a wave generator that is used to generate the generated wave;

the wave generator includes a phase generator and a direct digital synthesizer (DDS);

the PI controller outputs a phase step that is inputted into the phase generator, and wherein the phase generator is operatively connected to the DDS;

the generated wave as output by the DDS is mixed or multiplied with the data input stream so as to produce the phase error;

the synchronized clock rate is determined based on a feedback process that modifies the frequency and/or phase of the generated wave until the phase error is below a predefined threshold at which point the transmitter clock rate of the data input stream and the frequency of the generated wave are considered to match;

the obtaining the phase error step is carried out recursively or iteratively until the phase error between the data input stream and the generated wave is below a predefined threshold at which point the transmitter clock rate of the data input stream and the frequency of the generated wave are considered to match;

the generated wave is a sinusoidal wave;

the method is carried out by a light communication node having a receiving device configured to carry out the method; and/or an initial frequency is used to generate the wave initially, and wherein the initial frequency is predetermined.

In accordance with another aspect of the disclosure, there is provided a light communication receiver. The light communication receiver includes: a photodetector for receiving a data input stream; and a clock extraction module having a phase generator, a direct digital synthesizer (DDS) operatively connected to an output of the phase generator, and a proportional integral (PI) controller with its output operatively connected to the phase generator. An output of the DDS is used to obtain a phase error that is inputted into the PI controller. The clock extraction module is configured to perform a feedback process that includes adjusting a frequency of the generated wave based on the obtained phase error until the phase error is below a predefined threshold at which point a transmitter clock rate of the data input stream and the frequency of the generated wave are considered to match. The light communication receiver is configured to decode the data input stream using a synchronized clock rate that is determined based on the feedback process in order to obtain data.

According to various embodiments, this automated topology determination system may further include any one of the following features or any technically-feasible combination of some or all of these features:

the synchronized clock rate is determined based on the adjusted frequency of the generated wave when the transmitter clock rate of the data input stream and the frequency of the generated wave are considered to match;

the PI controller is used to generate a phase step as the output that is operatively connected to the phase generator, and wherein the phase step is generated based on the phase error;

the phase error is obtained by mixing or multiplying the data input stream with the generated wave;

the synchronized clock rate is intrinsically synchronized to the data input stream without use of external communications;

the clock extraction module is configured to provide the synchronized clock rate to a finite state machine; and/or the finite state machine is operatively connected to a processor so as to provide the data to the processor.

BRIEF DESCRIPTION OF THE DRAWINGS

Preferred exemplary embodiments will hereinafter be described in conjunction with the appended drawings, wherein like designations denote like elements, and wherein:

FIG. 6 depicts a schematic of exemplary components of a proportional integral (PI) controller of the clock extraction module of FIG. 5, according to one embodiment;

DETAILED DESCRIPTION

Figure 1:
FIG. 1 depicts a light communications system that includes a transmitting device and a receiving device, according to one embodiment.
Figure 1:
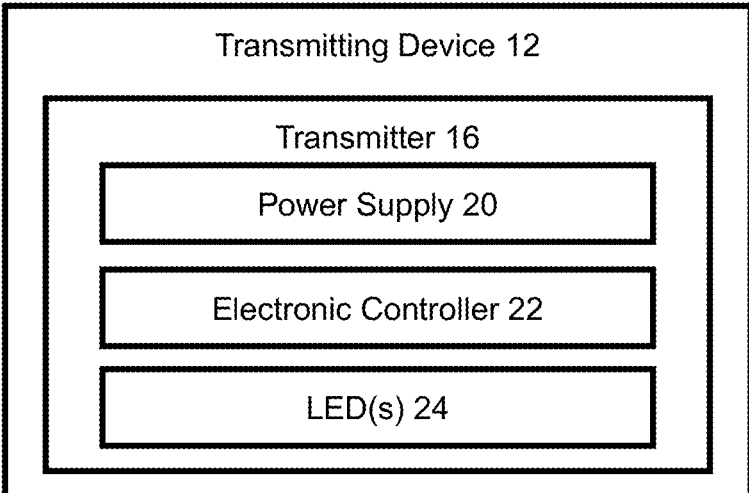
Figure 1:
Figure 1:
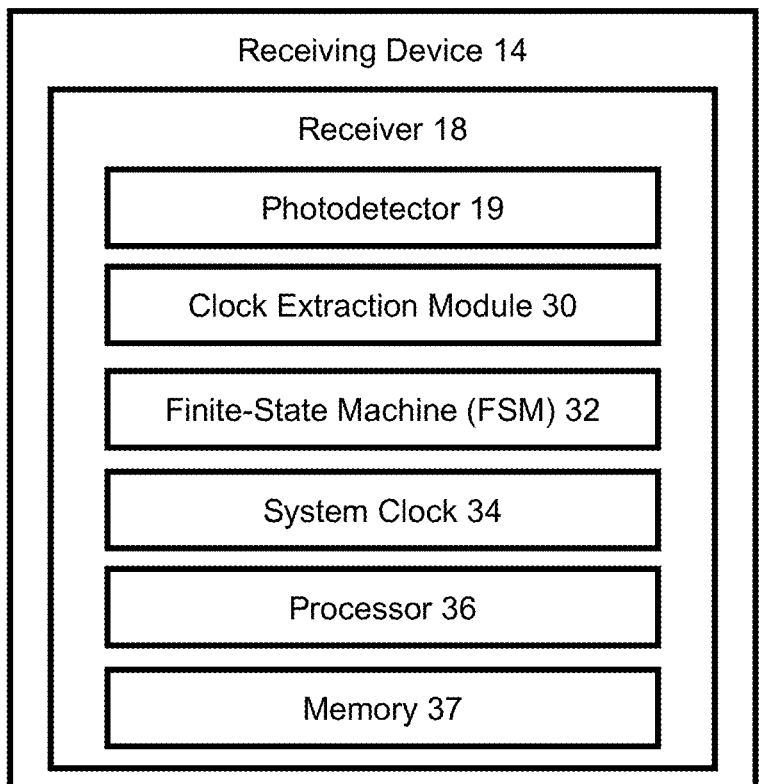

The system and method discussed herein enable synchronization of communications between two electronic devices that are carried out using optical or light communications and, in particular, the system and method enable intrinsic ad hoc synchronization of such communications, at least according to some embodiments. Such electronic devices having optical or light communication capabilities, such as line-of-sight optical communication capabilities, are each referred to as a light communication node and may include one or more transmitters for transmitting light in order to send data to another node and/or may include one or more receivers for receiving light in order to obtain data sent by another node. The "light" or "optical" communications discussed herein means not only visible light, but also light invisible to the human eye that has a wavelength suitable for use in line-of-sight communication, including at least portions of the infrared (IR), visible, and ultraviolet (UV) light spectrums. The transmitter encodes or modulates the data using light at or according to a transmitter clock rate and transmits such encoded data as a data input stream, which is then received at the receiver. At least in some embodiments, in order to properly decode and/or interpret the data input stream so as to obtain the data that is being communicated by the transmitter, the receiver synchronizes a clock that matches that used by transmitter to encode the data input stream. In this embodiment, the synchronized clock is then used to decode the data input stream so as to obtain the data.

According to at least some embodiments, there is provided a method for synchronizing a receiver with a transmitter so as to decode a data input stream transmitted by the transmitter and received at the receiver. According to embodiments, the method includes receiving a data input stream at a receiver, the data input stream having a first data rate that is set based on a transmitter clock rate; generating a wave; obtaining a phase error between the data input stream and the generated wave; determining a synchronized clock rate by using the phase error to adjust the frequency of the generated wave so as to match the phase and/or frequency of the generated wave to the transmitter clock rate of the data input stream; and using the synchronized clock rate to decode the data input stream so as to obtain data encoded in the data input stream.

According to some embodiments, there is provided a light communication receiver that includes a photodetector for receiving a data input stream; and a clock extraction module having a phase generator, a direct digital synthesizer (DDS) operatively connected to an output of the phase generator, and a proportional integral (PI) controller with its output operatively connected to the phase generator. In this embodiment, an output of the DDS is used to obtain a phase error that is inputted into the PI controller as well as to obtain a synchronized clock rate once the frequency of the generated wave and the transmitter data rate of the data input stream match. According to this embodiment, the clock extraction module is configured to perform a feedback process that includes adjusting a frequency of the generated wave based on the obtained phase error until the phase error is below a predefined threshold at which point a transmitter clock rate of the data input stream and the frequency of the generated wave are considered to match. The light communication receiver is configured to decode the data input stream using a synchronized clock rate that is determined based on the feedback process, at least according to the present embodiment.

With reference to FIG. 1, there is shown a light communication system 10 having a transmitting device 12 and a receiving device 14. The transmitting device 12 has a transmitter 16 that is used to communicate data with a receiver 18 of the receiving device 14. In one embodiment, the transmitting device 12 is a first vehicle, such as a first automobile, and the receiving device 14 is a second vehicle, such as a second automobile. The transmitter 16, which may be comprised of one or more light sources and transmitter circuitry, transmits data by modulating or encoding the data using light emitted, and this emission of light having encoded data is referred to as the data input stream. The data input stream is received at the receiver 18, which may be comprised of receiver circuitry having a photodetector 19, and, in some embodiments, the receiver 18 may include certain componentry or circuitry of the receiver circuit 78 or dedicated receiver circuit 78' described in U.S. Pat. No. 11,245,469, which is incorporated herein by reference.

The transmitter 16 may be comprised of one or more light sources, such as one or more light emitting diodes (LEDs), and other transmitter circuitry, such as the integrated driver circuit 76 and/or the dedicated driver circuit 76' described in U.S. Pat. No. 11,245,469, which is incorporated herein by reference. According to at least some embodiments, to transmit messages, light emitted by the transmitter 16, such as by one or more LEDs, may be encoded or modulated (pulsed) by the transmitter circuitry (or other transmitter control) using a transmission signal that is modulated according to the message to be transmitted. In this way, the light source (e.g., the LED(s)) is effective to optically communicate the message from the transmitter 16. Various encoding techniques may be used, such as time, frequency, or digital encoding; for example, using frequency shift keying (FSK) to digitally transmit the messages as binary data. The message may be sent in data packets, with error checking, encryption, and other data messaging techniques used as needed or desirable for a particular application.

Figures 2, 3:
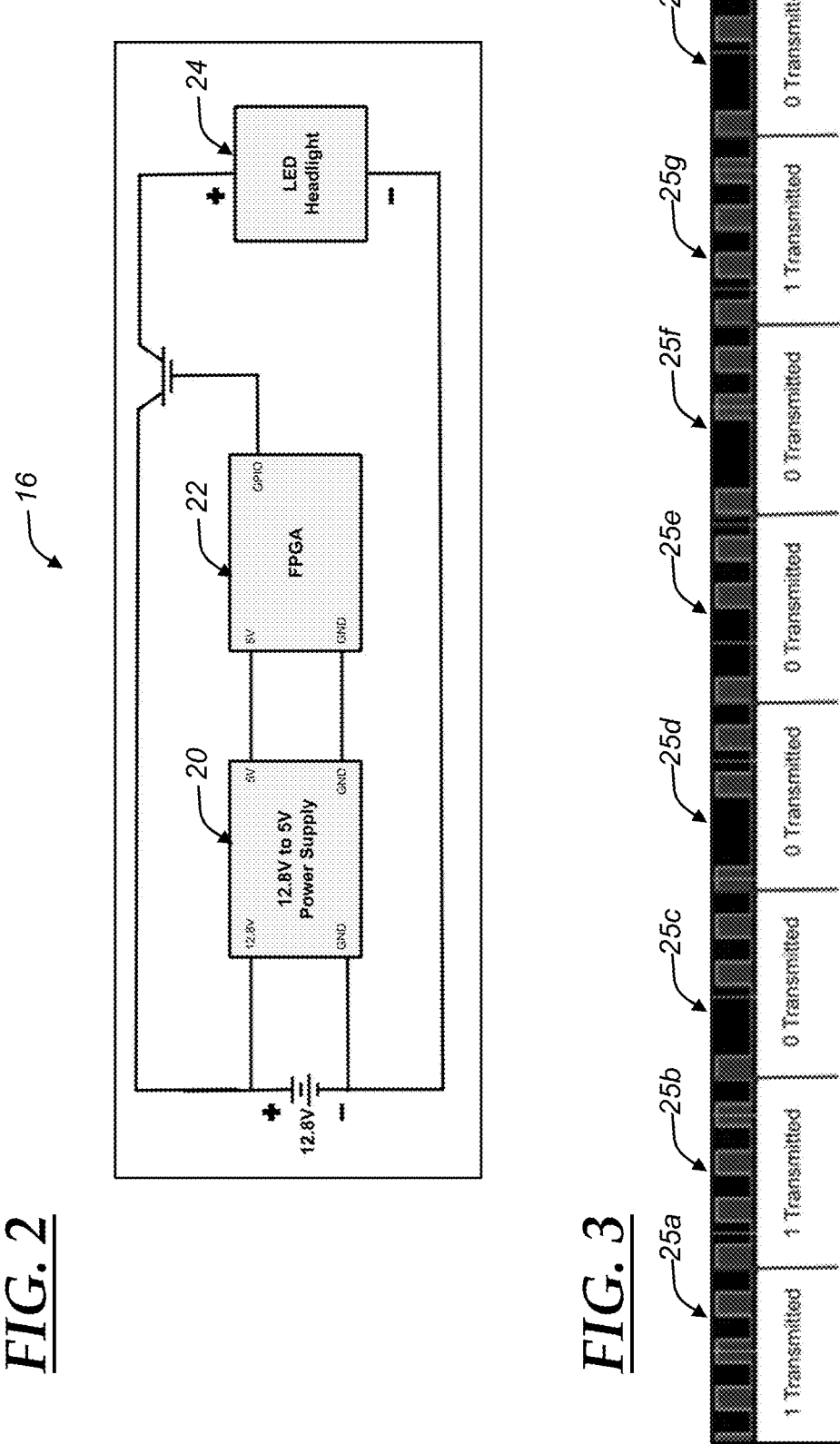
FIG. 2 depicts a schematic of exemplary components of a transmitter of the transmitting device of FIG. 1, according to one embodiment.
FIG. 3 depicts an example of encoding a byte using an exemplary four cycle encoding scheme, according to one embodiment.

With reference to FIG. 2, there is shown the transmitter 16, which includes a power supply 20, an electronic controller 22 that is shown as a field programmable gate array (FPGA), and a light source 24. It should be appreciated that other types of processors or controllers may be used instead of or in addition to the FPGA for the electronic controller 22. The electronic controller 22 may obtain data to be transmitted in digital form, and this data may be encoded so that the clock signal (or transmitter clock rate) may be derivable or extractable using the receiver 18. In one embodiment, each bit is transmitted using four clock cycles or phases and this enables consistent extraction of the clock signal through use of the internal synchronization method described herein. For example, with reference to FIG. 3, there is shown an example of encoding the binary data byte 11000010 (as indicated at 25a—h) using this four cycle encoding scheme. In other embodiments, a N-cycle encoding scheme where N is a number other than four (4) may be used. At least according to some embodiments, since the data is encoded in a manner in which only the clock signal is transmitted, this ensures all pulses are in phase with one another and there is no secondary data frequency for the receiver 18 (specifically, a clock extraction module 30 of the receiver 18, as discussed above with respect to FIG. 4) to lock onto. This is accomplished by transmitting the clock signal, and allocating four clock cycles to each bit. When a zero-bit is transmitted, a single clock cycle runs low, such as is shown in FIG. 3.

Figures 4, 5:
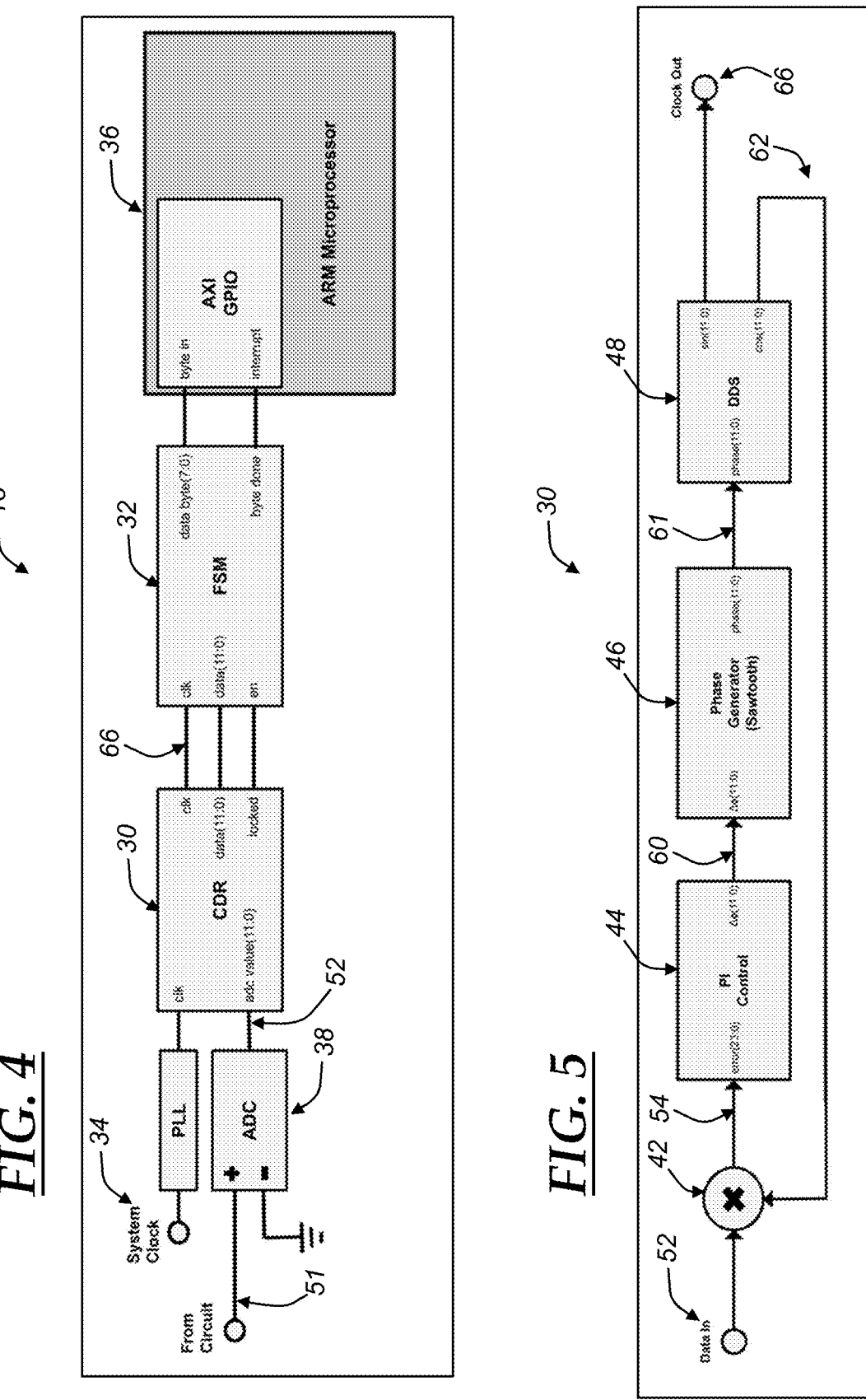
FIG. 4 depicts a schematic of exemplary components of a receiver of the receiving device of FIG. 1, according to one embodiment.
FIG. 5 depicts a schematic of exemplary components of a clock extraction module of the receiver of FIG. 4, according to one embodiment.

The receiver 18 may be comprised of receiver circuitry, which may include componentry and/or circuitry of the receiver circuit 78 and/or the dedicated receiver circuit 78' described in U.S. Pat. No. 11,245,469, which is incorporated herein by reference. With reference to FIGS. 1 and 4, there is shown the receiver 18, which includes the photodetector 19 (FIG. 1), a clock extraction module 30, a finite-state machine (FSM) 32, a system clock 34, a processor 36, and memory 37. The photodetector 19 may include one or more photodiodes (e.g., p-n photodiode(s), p-i-n photodiode(s), avalanche photodiode(s)) and/or other photodetector elements, such as metal-semiconductor-metal (MSM) photodetector(s). The receiver 18 is also shown as having an analog-to-digital converter (ADC) 38, which may convert the data input stream from analog form (indicated at 51) to digital form (indicated at 52) prior to the data being fed into the clock extraction module 30, as shown in FIG. 4.

With reference to FIG. 5, the clock extraction module 30 is shown as including a mixer/multiplier 42, a proportional integral (PI) controller 44, a phase generator 46, and a direct digital synthesizer (DDS) 48. The clock extraction module 30, which takes a digital data input stream as an input as indicated at 52, provides a synchronized clock output (indicating a synchronized clock rate) 66 that is synchronized to the data input stream. In at least some embodiments, the purpose of the clock extraction module (or clock-data recovery (CDR) module) 30 is to extract the clock rate of the data input stream (the transmitter clock rate) and to replicate a clock with a matching frequency (the synchronized clock rate) at the receiver 18. This enables the data input stream to be properly decoded at the receiver through use of the synchronized clock rate. As shown in FIG. 5, the mixer/ multiplier 42 is used to obtain a phase error, as indicated at 54, which is then fed into the PI controller 44.

Figure 6:
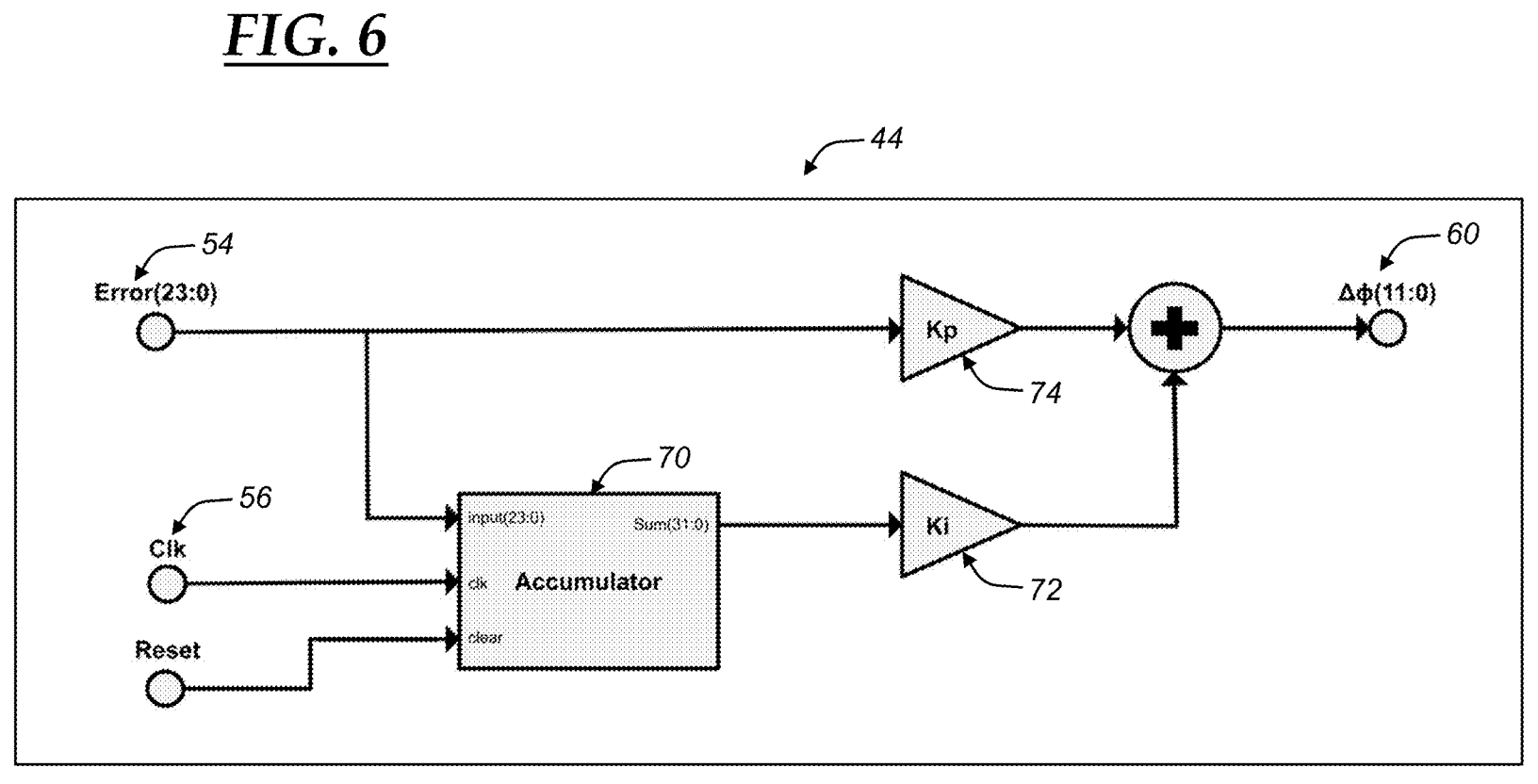

With reference to FIG. 6, the PI controller 44 is shown as taking the obtained phase error 54 and the clock being adjusted (referred to as the "in-sync-progress clock"), as indicated at 56, as input and provides a phase step ($\Delta\Phi$) (which is used as a clock control feedback) as indicated at 60, which is used to control the frequency of the wave generated by the DDS 48. In at least some embodiments, the DDS 48 operates as a wave generator for generating a start or base wave at an initial frequency. The phase generator 46 is used to control the frequency of the DDS 48. The DDS 48 uses a 12-bit lookup table that corresponds to values around the unit circle. The phase generator 46 outputs a sawtooth function representing the phase of the signal being produced. When the PI controller 44 corrects by increasing or decreasing the frequency, the phase step ($\Delta\Phi$), as indicated at 60, of the sawtooth function will increase/decrease to match. The phase generator 46 and the DDS 48 are used as a wave generator for generating the wave that is fed as input into the clock extraction module 30 as indicated at 62. As shown, the phase step 60 is determined by the PI controller 44 via feedback from the DDS 48 as indicated at 62 and this allows correction until the phase and frequency (i.e., clock or data rate) of the data input stream and the generated wave are matched and an extracted or synchronized clock rate is determined as indicated at 66, which enables decoding the data input stream to obtain data. As shown in FIG. 5, the phase step 60 is then used by the phase generator 46 to generate a phase input 61, which is fed into the DDS 48 and used to generate the wave.

The PI controller 44 includes an accumulator 70, which takes the phase error 54 as input as well as the in-sync-progress clock 56, and then PI controller 44 outputs a phase step ($\Delta\Phi$) 60, which is used to adjust the generated wave. The accumulator 70 is used to provide input into the integral gain component 72 of the PI controller 44, which is then used along with a proportional gain component 74 to provide the phase step ($\Delta\Phi$) 60.

Figure 7:
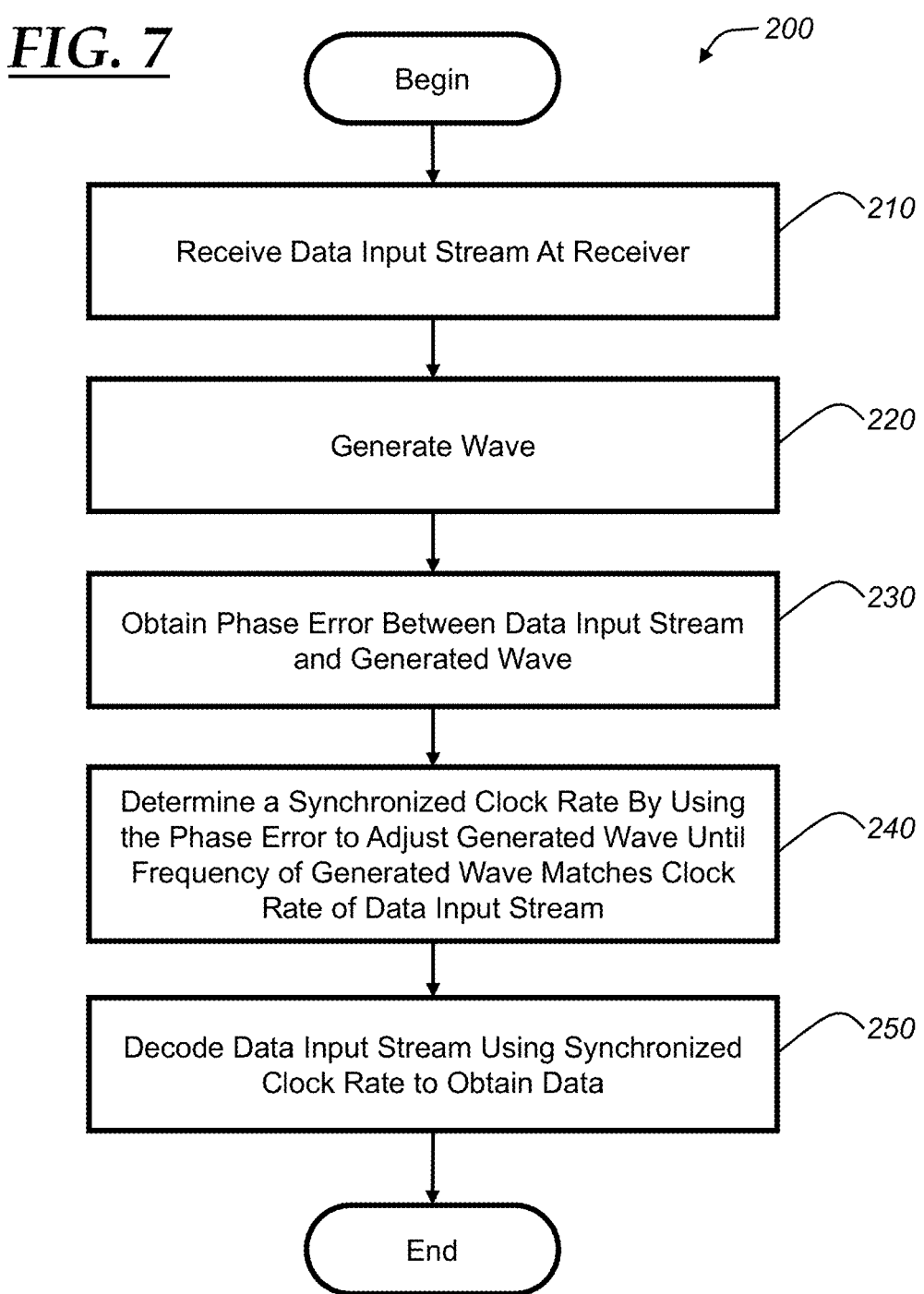
FIG. 7 is a flowchart of a method of synchronizing a receiver with a transmitter so as to decode a data input stream transmitted by the transmitter and received at the receiver, according to one embodiment.

With reference to FIG. 7, there is shown an embodiment of a method 200 of synchronizing a receiver with a transmitter so as to decode a data input stream transmitted by the transmitter and received at the receiver. According to at least some embodiments, the method 200 is carried out by the receiver 18 of the receiving device 14 and, as such, the method 200 may include use of one or more components of the receiving device 14, as will be appreciated by those skilled in the art in light of the following discussion. It will also be appreciated that, while the steps 210-250 are discussed as being carried out in a particular order, the steps may be carried out in any suitable and technically-feasible order.

The method 200 begins with step 210, wherein a data input stream is received at a receiver, where the data input stream was transmitted at a first data rate that is set based on a transmitter clock rate. As used herein, the term "transmitter clock rate" refers to the rate of a clock used by the transmitter as a part of encoding data of the data input stream that is transmitted to the receiver. And, as used herein, the term "data rate" refers to the rate at which a bit of data is provided over time, such as the rate at which a bit of data is transmitted by the transmitter. It is assumed that the data rate at which the data input stream is transmitted is the same as the data input stream as received at the receiver since such actual differences are negligible, at least according to some embodiments and implementations, such as when the method 200 is used for certain vehicle-to-everything (V2X) communications. The method 200 continues to step 220.

In step 220, a wave is generated, where the wave has an initial frequency. In at least some embodiments, the wave is a sinusoidal wave that is generated by the DDS 48. The initial frequency may be predetermined and may be stored in memory, such as in memory 37 of the receiver 18. The wave may be generated by a wave generator, such as, for example, the DDS 48, which may generate a wave based on a phase input 61 in FIG. 5. The phase input 61 may be generated by the phase generator 46. As shown in FIG. 5, the clock extraction module 30 implements a feedback loop in which the frequency and/or phase of the generated wave is adjusted. The method 200 continues to step 230.

In step 230, a phase error between the data input stream and the generated wave is obtained. As shown in FIG. 5, in one embodiment, the mixer/multiplier 42 of the clock extraction module 30 is used to generate the phase error 54 based on the data input stream 52 and the generated wave 62. The sinusoidal of the generated wave 62 is multiplied by the data input stream, where the resulting product is similar to the trigonomic identity $\sin(x) \times \sin(y) = \frac{1}{2} [\cos(x-y) - \cos(x+y)]$. In this identity, the $\cos(x-y)$ term represents the difference in phase between the two signals. After eliminating the $\cos(x+y)$ with a low pass filter, the resulting signal is used as the phase error 54.

Figure 10:
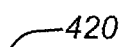
FIG. 10 is a graph of an example of sine wave that is generated by a direct digital synthesizer (DDS) of a clock extraction module, according to one embodiment.
Figure 10:
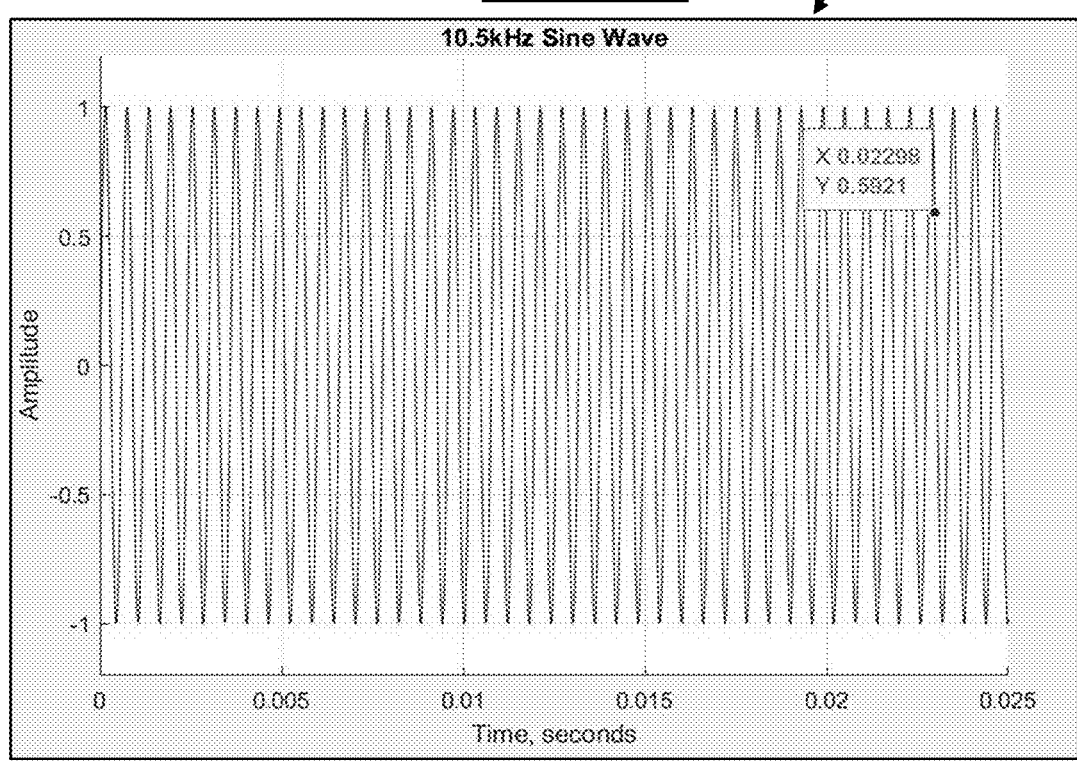
Figure 11:
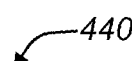
FIG. 11 is a graph of the product of the two signals of FIGS. 9 and 10, according to one embodiment.
Figure 12:
FIG. 12 is a graph of a filtered signal that is based on filtering the signal of FIG. 11, according to one embodiment.

In the example shown in FIGS. 9-12, the square wave input data 400 (FIG. 9) is being transmitted at 10 kHz, while the DDS sinusoidal 420 is generating a 10.5 kHz sine wave (FIG. 10). The product 440 (FIG. 11) of these two signals is a signal composed of a 20.5 kHz signal added with a 0.5 kHz signal. After filtering the 20.5 kHz signal, only the 0.5 kHz signal representing the phase difference 460 (FIG. 12) is left. The method 200 continues to step 240.

Figures 13, 15:
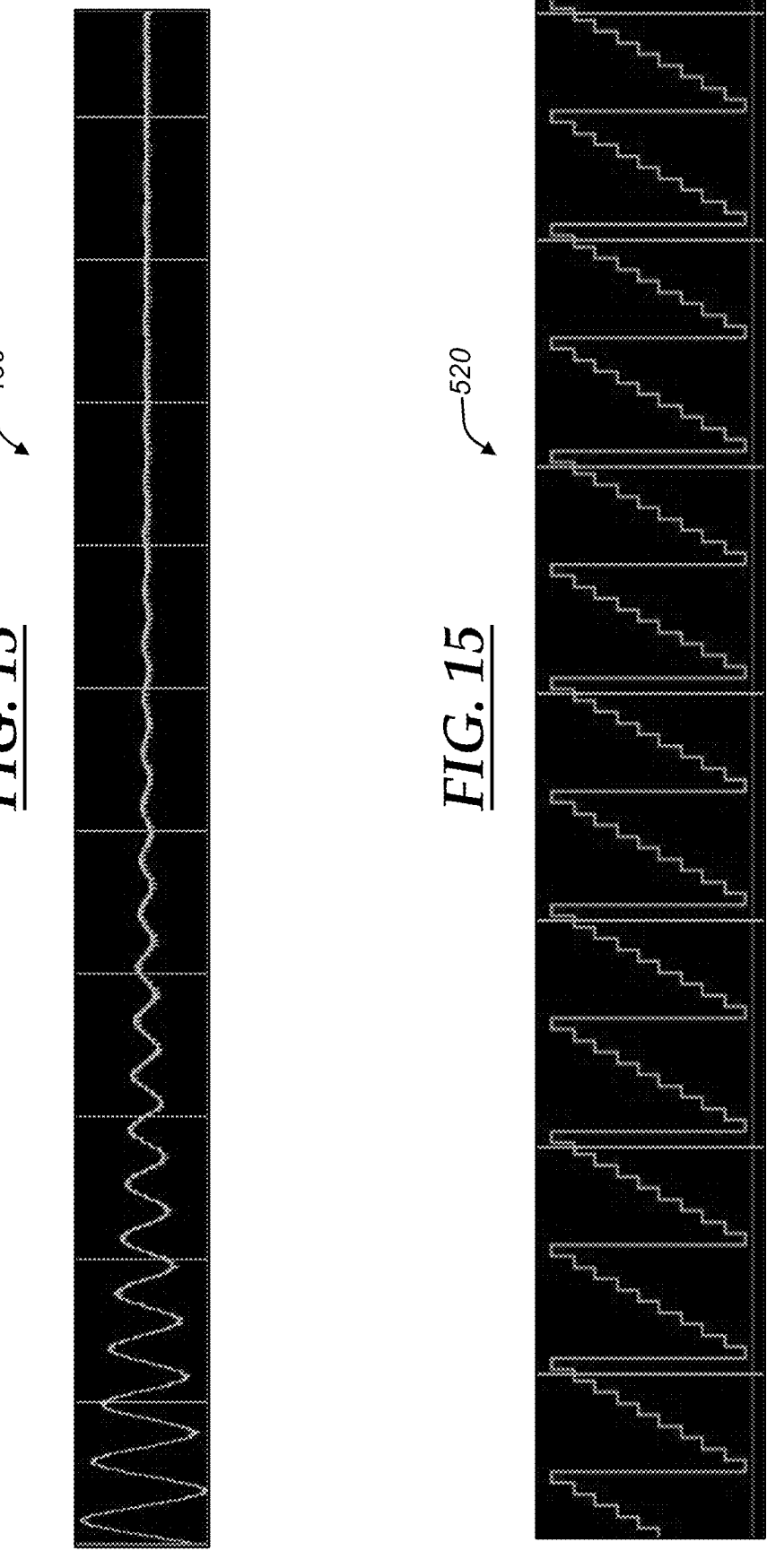
FIG. 13 is a graph of a phase step ($\Delta\Phi$) of a PI controller, according to one embodiment.
FIG. 15 is a sawtooth function that represents the phase of the signal being produced, according to one embodiment.
Figure 14:
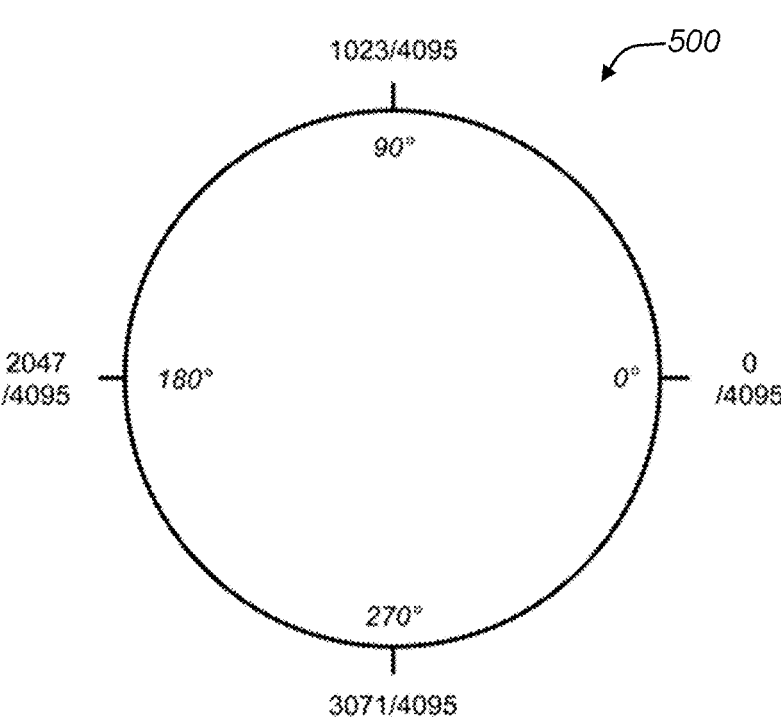
FIG. 14 is a unit circle showing values located therearound and that is used by a DDS, according to one embodiment.

In step 240, a synchronized clock rate is determined by using the phase error to adjust the frequency of the generated wave so as to match the frequency of the generated wave to the transmitter clock rate of the data input stream. The synchronized clock rate may also be referred to as an extracted clock rate as it is extracted from the data input stream. In at least some embodiments, the phase error is fed as an input into the PI controller 44 and the PI controller 44 controls the frequency of the sinusoidal generated by the DDS 48, meaning that as the phase error 54 approaches zero, the frequency of the sinusoidal converges on the value of the received data input stream 52. For example, as shown in FIG. 13, the phase step ($\Delta\Phi$) 60 of the PI controller 44 is shown as converging over time as indicated at 480. The phase generator 46 is used to control the frequency of the DDS 48. In the illustrated embodiment, the DDS 48 is a 12-bit lookup table that corresponds to values around the unit circle 500, such as that which is shown in FIG. 14. The phase generator 46 outputs a sawtooth function representing the phase of the signal being produced as is represented at 520 in FIG. 15. When the PI controller 44 corrects by increasing or decreasing the frequency, the phase step ($\Delta\Phi$) 60 of the sawtooth function will increase/decrease to match the transmitter clock rate. The method 200 continues to step 250.

In step 250, the data input stream is decoded using the synchronized clock rate to obtain the data encoded within the data input stream. Since the transmitter clock rate of the data input stream is extracted as the synchronized clock rate, the data input stream may be interpreted by the receiver. For example, the receiver 18 may use the synchronized clock rate to demodulate or otherwise decode the data, such as by splitting the data input stream into segments each represented by four periods, such as is shown in FIG. 3. The method 200 ends.

Figure 8:
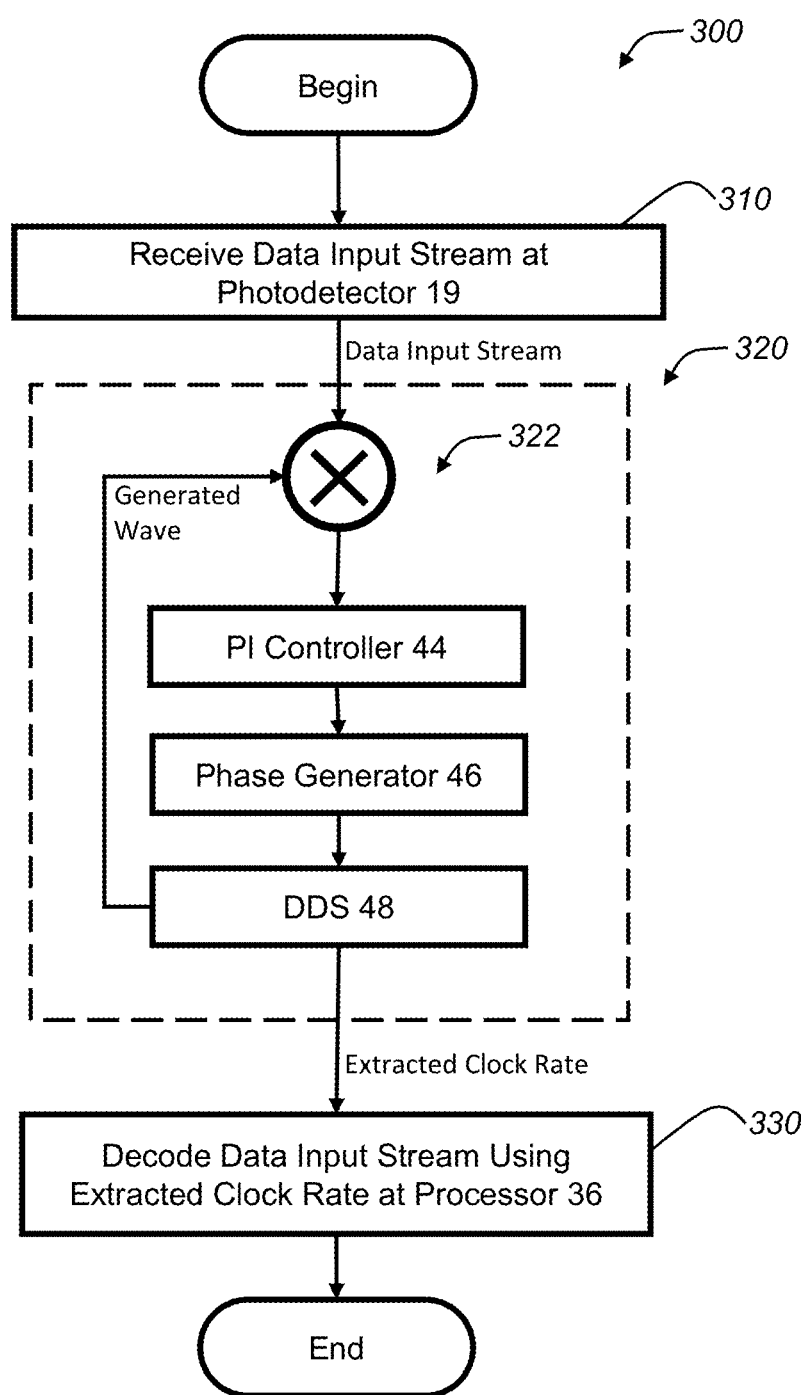
FIG. 8 is a flowchart of a method of synchronizing a receiver with a transmitter so as to decode a data input stream transmitted by the transmitter and received at the receiver, according to one embodiment.
Figure 9:
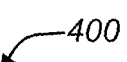
FIG. 9 is a graph of an example of square wave input data that is generated, according to one embodiment.
Figure 9:
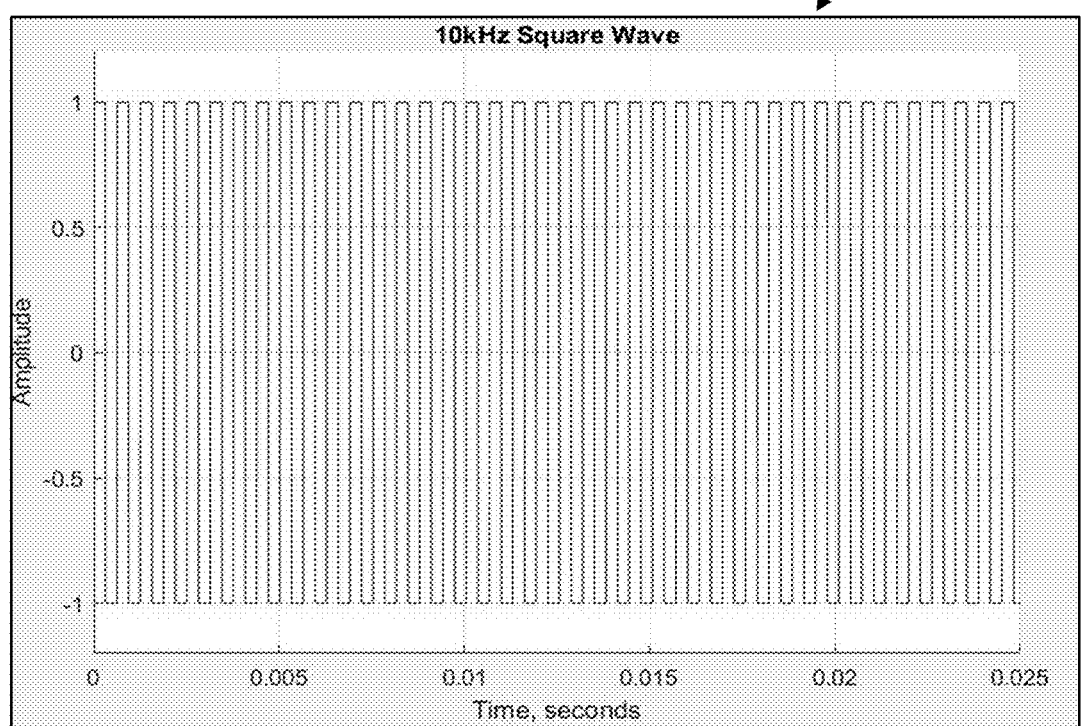

With reference to FIG. 8, there is shown an embodiment of a method 300 of synchronizing a receiver with a transmitter so as to decode a data input stream transmitted by the transmitter and received at the receiver. According to at least some embodiments, the method 300 is carried out by the receiver 18 of the receiving device 14. The method 300 may include use of one or more components of the receiving device 14, as will be appreciated by those skilled in the art in light of the following discussion. In step 310, the data input stream is received—this step is analogous to step 210 of the method 200 and that discussion is attributed to this step 310. The method 300 continues to step 320.

In step 320, a clock rate is extracted through a feedback clock rate matching process 322. In at least one embodiment, the feedback clock rate matching process includes steps 210-240 of the method 200 discussed above. In some embodiments, the feedback clock rate matching process includes tuning or adjusting the frequency of a generated wave, such as a sinusoidal wave, until the frequency matches the transmitter clock rate, which is the clock rate used for encoding data transmitted by the transmitter. In some embodiments, using an encoding in which each bit is represented by four periods of the transmitter clock rate enables extracting the transmitter clock rate at the receiver through use of the feedback clock rate matching process. The feedback clock rate matching process includes multiplying/mixing the wave generated by the DDS 48 with the data input stream as described above, and then using the PI controller 44, the phase generator 46 and the DDS 48 to adjust the frequency of the generated wave until the frequency matches the transmitter clock rate. The method 300 continues to step 330.

In step 330, the data input stream is decoded using the extracted clock rate to obtain the data encoded within the data input stream. This step is analogous to step 250 of the method 200 and that discussion is attributed to this step 330. The method 300 ends.

In some embodiments, the extracted/synchronized clock rate for a particular transmitting device may be stored in memory of the receiving device 14, such as in memory 37 of the receiver 18, and used for communications with that particular transmitting device. For example, a device ID of the transmitting device may be conveyed using the data input stream or generated by the receiving device 14, which may assign a generated device ID to each unique device detected. The generated ID may be stored in memory 37 with the extracted clock rate and used for communications with that device.

In at least some embodiments, the method 200 and/or the method 300 enable ad hoc data communication synchronization such that, for each data input stream transmitted and received at the receiver 18, the receiver 18 or receiving device 14 may determine the synchronized or extracted clock rate for that data input stream. Thus, in such embodiments, the synchronized or extracted clock rate need not be stored as it may be readily determined using the steps 220-240 of the method 200 or step 320 of the method 300.

As will now be appreciated by those skilled in the art, the method 200, the method 300, and/or the light communication system 10 may be adapted for extracting a clock rate from a data input stream so that the data input stream may be decoded to obtain data being communicated between the transmitting device and the receiving device, such as for purposes of communicating information between the transmitting device 12 and the receiving device 14. Various specific vehicle applications will be apparent to those skilled in the art.

Figures 16, 17:
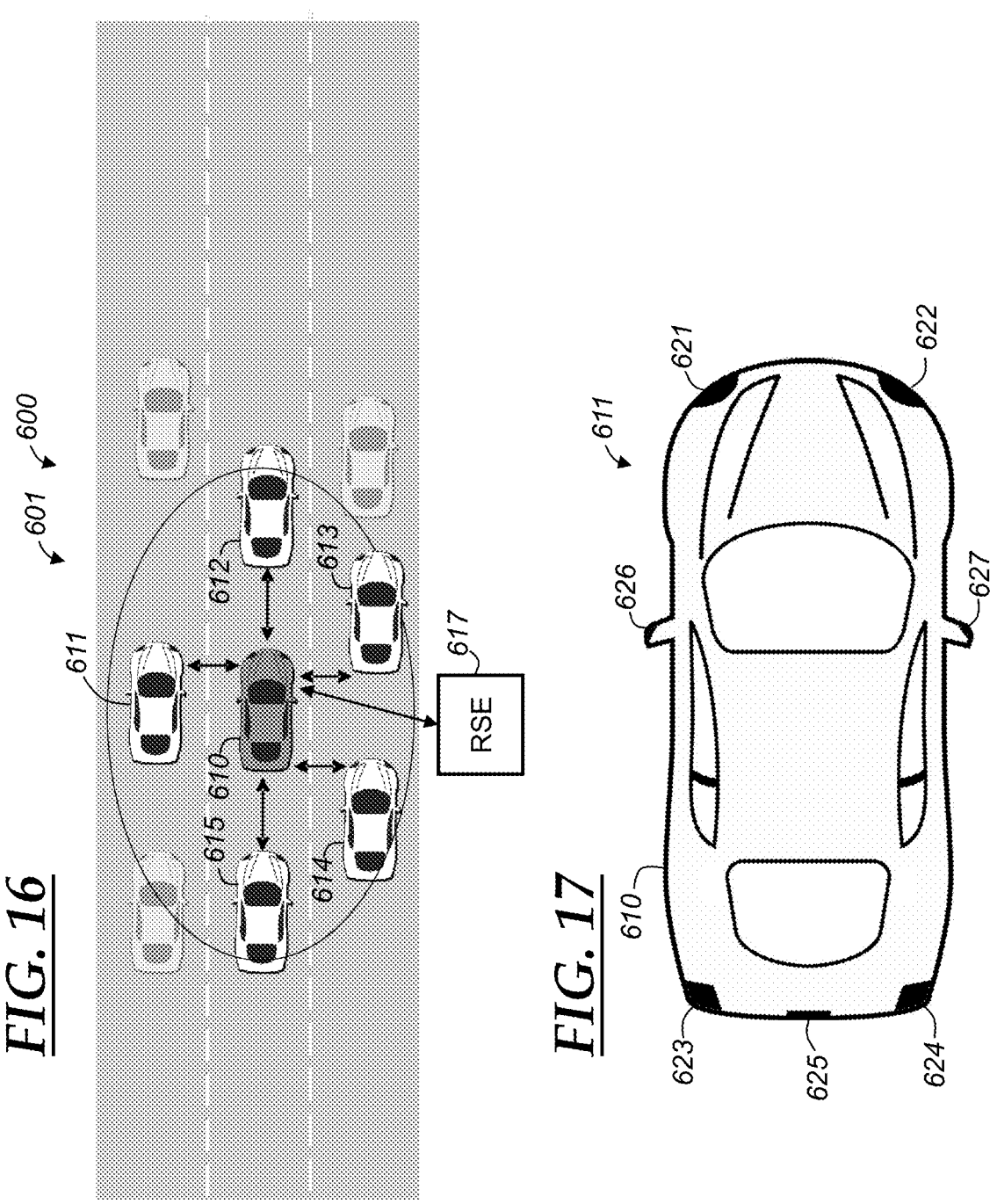
FIG. 16 is a diagram of a vehicle communications system that includes a host vehicle and other vehicles, which communicate using a light communication system, according to one embodiment.
FIG. 17 is a depiction of the host vehicle of FIG. 16, including a plurality of light communication modules, according to one embodiment.

FIG. 16 provides one such example directed to a vehicular application in which components and/or features of the above-discussed system 10 and method(s) 200,300 may be used. In particular, FIG. 16 depicts a vehicle communications system 600 that includes a first or host vehicle 610, a second vehicle 611, a third vehicle 612, a fourth vehicle 613, a fifth vehicle 614, a sixth vehicle 615, and roadside equipment (RSE) 617. Each of the vehicles 610-616 and the RSE 617 may include one or more light communication modules that include a transmitting device and/or a receiving device, and may thus be referred to as light communication nodes 612-617 that communicate with one another in an ad hoc light communication network 601. For example, each of the light communication nodes 612-617 may include one or more transmitting devices and one or more receiving devices such as for purposes of carrying out bidirectional communications with the other light communication nodes 612-617 in the ad hoc light communication network 601. The one or more transmitting devices of the light communication nodes 612-617 may each be a transmitting device characterized above as the transmitting device 12. The one or more receiving devices of the light communication nodes 612-617 may each be a transmitting device characterized above as the receiving device 14. The discussion of the ad hoc line-of-sight optical communication network described in U.S. Pat. No. 11,245,469 is hereby incorporated herein by reference and attributed to the vehicle communications system 600.

FIG. 17 depicts the host vehicle 610, which is shown as including vehicle electronics 611 having a left headlight communication module 621, a right headlight communication module 622, a left taillight communication module 623, a right taillight communication module 624, a center taillight communication module 625, a left side mirror communication module 626, and a right side mirror communication module 627. Each of these light communication modules 621-627 includes a transmitting device and a receiving device for bidirectional light communications and is integrated into an existing headlight or taillight of the host vehicle 610, such as is described in U.S. Pat. No. 11,245, 469, which is hereby incorporated herein by reference and attributed to the host vehicle 610 to the extent that discussion is not inconsistent with the express discussion herein of the host vehicle 610. Moreover, it should be appreciated that, in other embodiments, the transmitting device(s) and/or receiving device(s) of the light communication modules 621-627 may be integrated into other components of the host vehicle 610 (instead of a headlight or other external vehicle light/lamp module) and/or may vary in configuration and number.

The transmitting device of each of the communication modules 621-627 may each be a transmitting device characterized above as the transmitting device 12. The receiving device of each of the communication modules 621-627 may each be a transmitting device characterized above as the receiving device 14. Each of the other light communication nodes 612-617 may likewise have light communication modules similar to the light communication modules 621-627 of the host vehicle 610 and may use these light communication modules for bidirectional communication in the ad hoc light communication network 601. In at least some embodiments, the ad hoc light communication network 601 is a line-of-sight ad hoc light communication network since the light communications in such an embodiment are line-of-sight optical or light communications. Each of the light communication modules discussed above may implement the method 200 and/or the method 300 for purposes of synchronizing communications between light communication modules within the ad hoc light communication network 601.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method for synchronizing a receiver with a transmitter so as to decode a data input stream transmitted by the transmitter and received at the receiver, comprising:
   receiving a data input stream at a receiver, the data input stream having a first data rate that is set based on a transmitter clock rate;
   generating a wave;
   obtaining a phase error between the data input stream and the generated wave;
   inputting the phase error into a proportional integral (PI) controller, wherein the PI controller is connected to a wave generator that is used to generate the generated wave;
   determining a synchronized clock rate by using the phase error to adjust the frequency of the generated wave so as to match the frequency of the generated wave to the transmitter clock rate of the data input stream; and
   using the synchronized clock rate to decode the data input stream so as to obtain data encoded in the data input stream.

2. The method of claim 1, wherein the wave generator includes a phase generator and a direct digital synthesizer (DDS).

3. The method of claim 2, wherein the PI controller outputs a phase step that is inputted into the phase generator, and wherein the phase generator is operatively connected to the DDS.

4. The method of claim 3, wherein the generated wave as output by the DDS is mixed or multiplied with the data input stream so as to produce the phase error.

5. The method of claim 1, wherein the synchronized clock rate is determined based on a feedback process that modifies the frequency and/or phase of the generated wave until the phase error is below a predefined threshold at which point the transmitter clock rate of the data input stream and the frequency of the generated wave are considered to match.

6. The method of claim 5, wherein the obtaining the phase error step is carried out recursively or iteratively until the phase error between the data input stream and the generated wave is below a predefined threshold at which point the transmitter clock rate of the data input stream and the frequency of the generated wave are considered to match.

7. The method of claim 1, wherein the generated wave is a sinusoidal wave.

8. The method of claim 1, wherein the method is carried out by a light communication node having a receiving device configured to carry out the method.

9. The method of claim 1, wherein an initial frequency is used to generate the wave initially, and wherein the initial frequency is predetermined.

10. A method for synchronizing a receiver with a transmitter so as to decode a data input stream transmitted by the transmitter and received at the receiver, comprising:
   receiving a data input stream at a receiver, the data input stream having a first data rate that is set based on a transmitter clock rate;
   generating a wave;
   obtaining a phase error between the data input stream and the generated wave;
   determining a synchronized clock rate by using the phase error to adjust the frequency of the generated wave so as to match the frequency of the generated wave to the transmitter clock rate of the data input stream; and
   using the synchronized clock rate to decode the data input stream so as to obtain data encoded in the data input stream, wherein the synchronized clock rate is determined based on a feedback process that modifies the frequency and/or phase of the generated wave until the phase error is below a predefined threshold at which point the transmitter clock rate of the data input stream and the frequency of the generated wave are considered to match.

11. The method of claim 10, wherein the method further comprises: inputting the phase error into a proportional integral (PI) controller, wherein the PI controller is connected to a wave generator that is used to generate the generated wave, and wherein the wave generator includes a phase generator and a direct digital synthesizer (DDS).

12. The method of claim 11, wherein the PI controller outputs a phase step that is inputted into the phase generator, and wherein the phase generator is operatively connected to the DDS.

13. The method of claim 12, wherein the generated wave as output by the DDS is mixed or multiplied with the data input stream so as to produce the phase error.

14. The method of claim 10, wherein the obtaining the phase error step is carried out recursively or iteratively until the phase error between the data input stream and the generated wave is below a predefined threshold at which point the transmitter clock rate of the data input stream and the frequency of the generated wave are considered to match.

15. The method of claim 10, wherein the generated wave is a sinusoidal wave.

16. The method of claim 10, wherein the method is carried out by a light communication node having a receiving device configured to carry out the method.

17. The method of claim 10, wherein an initial frequency is used to generate the wave initially, and wherein the initial frequency is predetermined.

5

* * * * *